United States Patent [19]

Haddad et al.

[11] Patent Number: 4,504,291
[45] Date of Patent: Mar. 12, 1985

[54] DROPOUT BOOT FOR POWER RECOVERY TRAIN

[75] Inventors: James H. Haddad, Princeton Junction, N.J.; Klaus W. Schatz, Philadelphia, Pa.

[73] Assignee: Mobil Oil Corporation, New York, N.Y.

[21] Appl. No.: 508,773

[22] Filed: Jun. 29, 1983

[51] Int. Cl.³ .............................................. B01D 45/08
[52] U.S. Cl. ...................................... 55/319; 55/462; 55/465
[58] Field of Search ................................... 55/319–321, 55/331, 426, 462–465, 189, 186–188, 435, 260; 60/39.12, 39.465; 422/147, 214

[56] References Cited

U.S. PATENT DOCUMENTS

| 988,406 | 4/1911 | Sweet | 55/462 |
|---|---|---|---|
| 2,332,063 | 10/1943 | Davis | 55/434 |
| 3,872,012 | 3/1975 | Endicott | 55/331 X |
| 4,035,171 | 7/1977 | Reed et al. | 55/319 |
| 4,164,398 | 8/1979 | Caesar | 55/186 |
| 4,205,972 | 6/1980 | Visos et al. | 55/465 X |
| 4,348,364 | 9/1982 | Gartside et al. | 422/214 |
| 4,377,394 | 3/1983 | Muengel et al. | 55/464 X |

Primary Examiner—Charles Hart
Attorney, Agent, or Firm—Alexander J. McKillop; Michael G. Gilman; Dennis P. Santini

[57] ABSTRACT

A dropout boot is provided for removing solid particles from a hot gas stream comprising an enclosed metal boot shell having an upper vertical inlet means adapted to receive hot gas from refractory lined gas conduit and having a lower horizontal outlet means for passing hot clean gas to an energy recovery system or the like; said boot shell having an upper flared portion adjacent the inlet means with outward and downwardly flared configuration whereby gas velocity is substantially reduced in the boot shell; a shell floor having open bottom horizontal baffle means for retaining solid particles from the gas; said outlet means having an inwardly extending portion with an upper horizontal overhang protruding into the boot shell below the flared portion and inlet means; and an outlet grating mounted over the horizontal outlet transversely of gas flow below the outlet overhang portion and sloped outwardly and downwardly therefrom.

7 Claims, 3 Drawing Figures

DROPOUT BOOT FOR POWER RECOVERY TRAIN

FIELD OF INVENTION

This invention relates to apparatus for separating solid particles from a hot gas stream. In particular, it relates to an improved dropout boot utilized in transporting flue gas from a catalyst regeneration system to an expander turbine-type power generator wherein hot gas from a refractory-lined flue gas recovery system is passed through a particle retention zone to prevent damage to downstream turbine equipment.

BACKGROUND OF INVENTION

Energy conservation techniques for industrial processes are frequently applied to process flue gas or other hot gaseous streams. Expander turbines may be employed in numerous continuous thermal processes to recover energy from the waste streams prior to venting. In petroleum refineries there are large scale combustion units, such as catalyst regeneration facilities, which produce flue gases in significant amounts. For instance, in modern petrochemical processes the oxidation of coke deposits on cracking catalysts or other hydrocarbon conversion media is carried out continuously or batchwise. A typical FCC unit transports fine catalyst particles from a cracking zone to a regeneration zone where air is passed over the coked catalyst at elevated temperature and pressure to produce a flue gas containing carbon oxides and other oxidation products. The flue gas from the regeneration stage contains entrained fine catalyst particles which are removed by conventional cyclonic separators, usually in 2-3 stages.

Due to the very high temperatures involved, materials of construction for the flue gas handling equipment often include refractory-lined carbon steel vessels and conduits. Although refractory linings are economically desirable for construction of high temperature apparatus, there is a possibility that spalling or attrition can cause hard solid particles to be broken off from the lining and propelled through the system into the flue gas, often travelling at speeds exceeding 30 meters/sec. The downstream turbine equipment employed in the power recovery train is easily damaged by solid particles and must be protected against the possibility of particles exceeding 1-5 mm. It is an object of the present invention to provide an improved device for retaining refractory particles or the like in power recovery trains to prevent turbine damage.

SUMMARY OF THE INVENTION

An improved dropout boot structure has been found to collect particles and prevent passage from upstream refractory-lined conduits and the like to the turbine section. Accordingly, a dropout boot is provided for removing solid particles from a hot gas stream comprising an enclosed metal boot shell having an upper vertical inlet means adapted to receive hot gas from refractory lined gas conduit and having a lower horizontal outlet means for passing hot clean gas to an energy recovery system or the like. The boot shell has an upper flared portion adjacent the inlet means with outward and downwardly flared configuration whereby gas velocity is substantially reduced in the boot shell. A shell floor has open bottom horizontal baffle means for retaining solid particles from the gas. The outlet means has an inwardly extending portion with an upper horizontal overhang protruding into the boot shell below the flared portion and inlet means; and an outlet grating is mounted over the horizontal outlet transversely of gas flow below the outlet overhang portion and sloped outwardly and downwardly therefrom.

In a preferred embodiment the boot shell has a substantially vertical cylindrical shape and substantially cylindrical inlet and outlet conduits connected thereto in axial alignment and the boot shell has an interior cross-sectional area at least twice that of each inlet and outlet conduit, thereby reducing average gas velocity in the boot shell at least 50% from the inlet velocity. Advantageously, the dropout boot outlet grating has parallel vanes vertically mounted at an angle of at least 22° from vertical and the outlet conduit is substantially the same size as the inlet conduit. A metal wear plate can be provided overlying the overhang portion within the boot shell.

These and other objects and features of the invention will be seen in the description and in the drawing.

THE DRAWING

DESCRIPTION OF PREFERRED EMBODIMENTS

Figure 1:
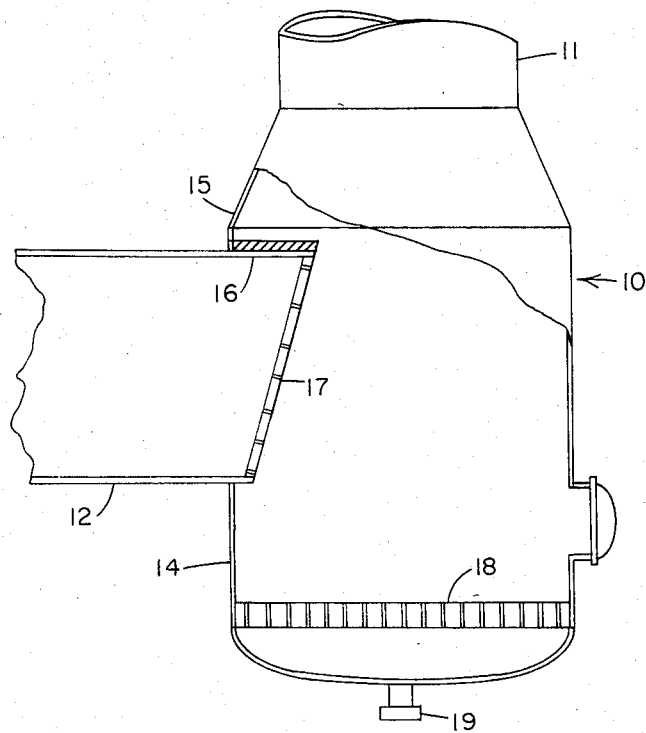
FIG. 1 is a vertical cross-sectional view of an improved dropout boot according to the present invention.

Referring to FIG. 1, a dropout boot 10 is connected in the power recovery train by an upper vertical inlet 11 and outlet 12. The structure includes an enclosed metal boot shell 14 adapted to receive hot gas from refractory lined gas conduit or the like. The boot shell 14 is an upper flared portion 15 adjacent the inlet means 11 with outward and downwardly flared configuration whereby gas velocity is substantially reduced in the boot shell, e.g. from 30 m/sec to below 15 m/sec. Outlet means 12 has an inwardly extending portion with an upper horizontal overhang 16 protruding into the boot shell below the flared portion 15 and inlet means 11. Preferably the overhang portion protrudes into the boot shell about ¼ shell diameter immediately below the flared shell portion and the outlet conduit is substantially above the floor bottom baffle. An outlet grating 17 is mounted over the horizontal outlet 12 transversely of gas flow below the outlet overhang portion 16 and sloped outwardly and downwardly therefrom. A shell floor 18 is provided having open bottom horizontal baffle means for retaining solid particles from the gas. Collected solids may be removed from the boot by withdrawal means 19 mounted in the boot shell below the floor bottom baffle.

Figure 2:
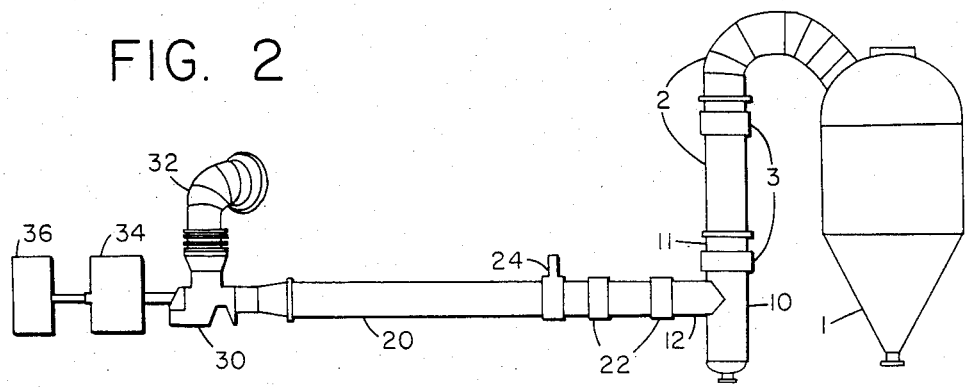
FIG. 2 is an elevational view of a typical power recovery train.

The location of the dropout boot 10 (or knockout pot, as it may sometimes be called) in a typical power recovery system is shown in FIG. 2, where a FCC catalyst recovery third stage cyclone unit 1 is connected by gas conduit 2 to the inlet 11 of the dropout boot 10. The cyclone vessel and the conduit sections upstream of the boot are preferable refractory line carbon steel vessels and pipes. Gimbal means 3 are provided in the gas conduit to permit movement under thermal expansion. After passing through the dropout boot 10, hot flue gas then is transported downstream through stainless steel equipment. Outlet 12 is operatively connected via conduit 20, gimbal means 22 and valve 24 to the expander turbine unit 30. The gas then exits the system through turbine exhaust 32 and may be passed through an orifice chamber (not shown) prior to venting. The energy recovered from the hot gas stream by turbine 30 is transferred by rotation to a motor-generator unit 34. During operation of the flue gas energy recovery system power is generated by the turbine recovery energy. During startup of the industrial process or as otherwise required, power may be generated by an optional steam power unit also coupled to the motor-generator unit.

Figure 3:
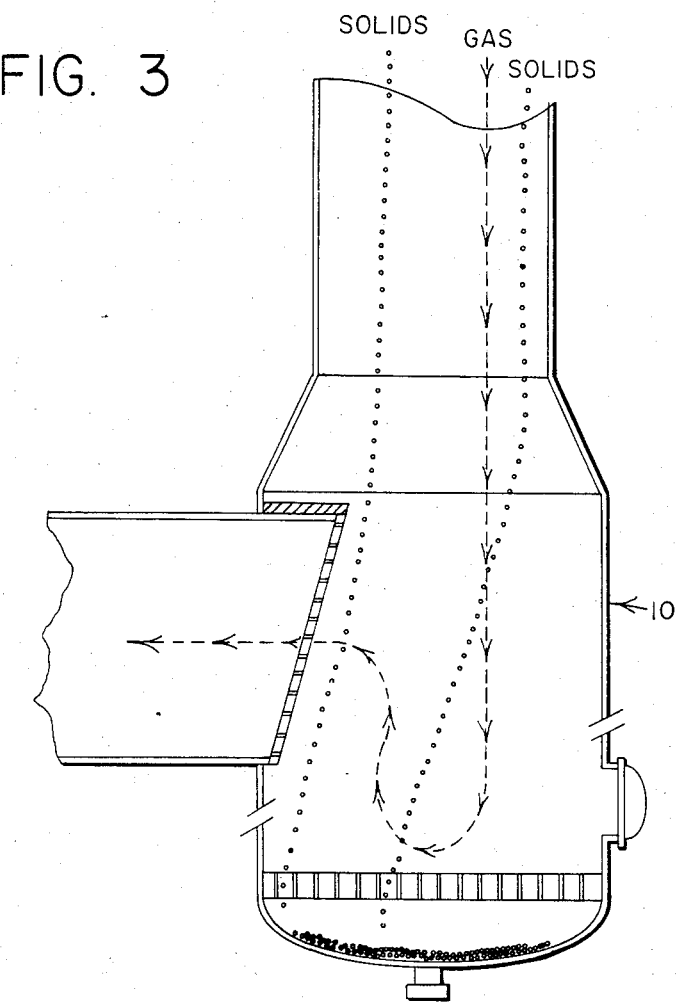
FIG. 3 is a schematic view of the dropout boot showing flow lines for gas and particles.

To further explain the particle retention and gas flow patterns of the boot, the internal paths are depicted in the vertical view of FIG. 3. The gas stream is indicated by dashed lines, whereas a typical particle trajectory is indicated by a series of dots representing the particle position in a time sequence. Since the gas is traveling a relatively high velocity through conduit 11, the solid particles (e.g.—⅛" refractory chips) are blown into the boot and are propelled downwardly in a vertical line until lateral gas velocity vectors tend to sweep the falling particles toward the horizontal outlet 12. The overhang outward slope is designed to prevent a predetermined particle size from being swept into the outlet. After passing the boot zone adjacent the outlet, the particles continue to fall through the shell floor, which is an open metal grid with wide openings to permit passage of the particles, a collection chamber below the floor bottom. Periodically the collection chamber can be opened through port 18 to permit withdrawal of the retained particles.

Preferably, the dropout boot is constructed so that the boot shell has a substantially vertical cylindrical shape and substantially cylindrical inlet and outlet conduits connected thereto in axial alignment. If boot shell has an interior cross-sectional area at least twice that of each inlet and outlet conduit, the average gas velocity in the boot shell is reduced at least 50% from the inlet velocity.

While the invention has been described by reference to certain embodiments, there is no intent to limit the inventive concept except as set forth in the following claims.

What is claimed is:

1. A dropout boot for removing solid particles from a hot gas stream comprising:
   an enclosed metal boot shell having an upper vertical inlet means adapted to receive hot gas from refractory lined gas conduit and having a lower horizontal outlet means for passing hot clean gas to an energy recovery system or the like;
   said boot shell having an upper flared portion adjacent the inlet means with outward and downwardly flared configuration whereby gas velocity is substantially reduced in the boot shell;
   the interior of said boot being unobstructed except for a shell floor, an outlet grating and said outlet means;
   said shell floor having open bottom horizontal baffle means for retaining solid particles from the gas;
   said outlet means having an inwardly extending portion with an upper horizontal overhang protruding into the boot shell below the flared portion and inlet means;
   said outlet grating mounted over the horizontal outlet transversely of gas flow below the outlet overhand portion and sloped outwardly and downwardly therefrom.

2. A dropout boot according to claim 1 wherein the boot shell has a substantially vertical cylindrical shape and substantially cylindrical inlet and outlet conduits connected thereto in axial alignment;
   said boot shell having an interior cross-sectional area at least twice that of each inlet and outlet conduit; thereby reducing average gas velocity in the boot shell at least 50% from the inlet velocity.

3. A dropout boot according to claim 2 wherein the outlet grating has parallel vanes vertically mounted to an angle of at least 22° from vertical and wherein the outlet conduit is substantially the same size as the inlet conduit.

4. A dropout boot according to claim 1 further comprising a metal wear plate overlying the overhang portion within the boot shell.

5. A dropout boot according to claim 2 wherein the overhang portion protrudes into the boot shell about ¼ shell diameter immediately below the flared shell portion and the outlet conduit is substantially above the floor bottom baffle.

6. A dropout boot according to claim 3 comprising solids withdrawal means mounted in the boot shell below the floor bottom baffle.

7. In a power recovery system wherein hot flue gas is transported from a refractory lined upstream section to a downstream expander turbine unit and wherein a solid particle retention means is provided, the improvement which comprises:
   a dropout boot operatively connected in the power recovery system for removing solid particles from the hot flue gas comprising
   an enclosed metal boot shell having an upper vertical inlet means adapted to receive hot gas from the refractory lined section and having a lower horizontal outlet means for passing hot clean gas to an energy recovery system or the like;
   said boot shell having an upper flared portion adjacent the inlet means with outward and downwardly flared configuration whereby gas velocity is substantially reduced in the boot shell;
   the interior of said boot being unobstructed except for a sheel floor, an outlet grating and said outlet means,
   said outlet means having an inwardly extending portion with an upper horizontal overhang protruding into the boot she below the flared portion and inlet means;
   said outlet grating mounted over the horizontal outlet transversely of gas flow below the outlet overhang portion and sloped outwardly and downwardly therefrom;
   said shell floor having open bottom horizontal baffle means and collection chamber for retaining solid particles from the gas.

* * * * *

UNITED STATES PATENT AND TRADEMARK OFFICE
CERTIFICATE OF CORRECTION

PATENT NO. : 4,504,291

DATED : March 12, 1985

INVENTOR(S) : James H. Haddad and Klaus W. Schatz

It is certified that error appears in the above-identified patent and that said Letters Patent is hereby corrected as shown below:

Col. 4, line 54, "she" should be --shell--.

Signed and Sealed this

Twenty-seventh Day of August 1985

[SEAL]

Attest:

DONALD J. QUIGG

Attesting Officer   Acting Commissioner of Patents and Trademarks